Feb. 10, 1970

J. B. S. COMPTON 3,494,676

PIVOTAL JOINT ASSEMBLIES

Filed Nov. 28, 1967

INVENTOR
JACK BERNARD SPENCER COMPTON
BY
Watson, Cole, Grindle + Watson
ATTORNEY

United States Patent Office 3,494,676
Patented Feb. 10, 1970

3,494,676
PIVOTAL JOINT ASSEMBLIES
Jack Bernard Spencer Compton, Crawley, England, assignor to Silentbloc Limited
Filed Nov. 28, 1967, Ser. No. 686,230
Claims priority, application Great Britain, Nov. 29, 1966, 53,429/66
Int. Cl. F16c 27/02, 35/02; F16b 7/00
U.S. Cl. 308—26
11 Claims

ABSTRACT OF THE DISCLOSURE

A pivotal joint, for example for vehicle suspensions, includes an elastomeric sleeve having a metallic tube within it and which are prevented from relative rotation, a polyurethane or other synthetic plastics sleeve being disposed within the metallic tube and being capable of rotation relatively to it, a fluid lubricant being contained in at least one chamber in the periphery of the polyurethane sleeve to provide lubricant to the relatively rotating surfaces, and the polyurethane sleeve being retained on an inner metallic sleeve e.g. by bonding, frictional engagement and/or interengaging projections and recesses on flanges of the inner metallic sleeve and the polyurethane sleeve.

---

This invention relates to pivotal joints for connecting relatively rotatable generally coaxial members and has for its object to provide a pivotal joint, particularly but not exclusively suitable for use in automobile suspension and steering systems, which will provide for a degree of radial resilience between the two members connected by the pivotal joint, that is to say, resilience in directions at right angles to the rotary axis of the joint, while providing for substantially free rotary movement between such members and avoiding the need for periodic lubrication of the joint.

The invention is concerned with pivotal joints of the kind in which the radial resilience referred to above is provided, at least partially, by including in the joint a bushing of rubber or like resilient elastomeric material, which, for convenience, will hereinafter be referred to as elastomeric material.

A pivotal joint according to the present invention includes four coaxial parts surrounding one another of which the outer three comprise sleeves having inner surfaces contacting the outer surface of the next inner part, one of the innermost and outermost parts (referred to hereinafter as the first part) being formed of an elastomeric material, the part contacting the first part (referred to hereinafter as the second part) being a rigid tubular member, the part contacting the second part (referred to hereinafter as the third part) being formed of synthetic plastics material having a lower flexibility than that of the elastomeric material and the part contacting the third part (hereinafter referred to as the fourth part) being of a rigid nature, the contacting surfaces of the second and third parts permitting relative rotation thereof about the axis but between them affording at least one chamber containing a fluid lubricant which is capable of lubricating the contacting surfaces of the second and third parts, the contacting surfaces of the first and second and of the third and fourth parts being substantially held against relative rotation, and means being provided substantially to prevent escape of lubricant from the ends of the second and third parts.

The plastics material may be polyurethane or any similar non-metallic material having the appropriate bearing qualities. The contacting surfaces of the plastics third part and the rigid fourth part may be bonded or arranged to adhere frictionally to one another, or otherwise be held from relative rotation.

For example, in order to provide for a suitable frictional adherence as referred to above, the rigid fourth part (which may also be a sleeve) may be received within the third part with an interference fit such that the third part is somewhat stretched circumferentially as it is applied to the fourth part. Alternatively, or, in addition, these parts may have cooperating projections and recesses at least partially to prevent their relative rotation, and these projections and recesses may, for example, be formed on abutting generally radial flanges of the third and fourth parts.

Thus, in a pivotal joint assembly according to the invention the elastomeric sleeve provides the required degree of radial resilience while substantially free rotary movement can take place between permanently lubricated bearing surfaces respectively on the sleeve of polyurethane or other non-metallic synthetic plastics material and the rigid third member.

The surface of the synthetic plastics sleeve which contacts the rigid tubular second part may be formed with a series of intersecting ribs so as to divide the chamber containing the fluid lubricant into a series of compartments, which chamber extends substantially throughout the length of the sleeve except for annular end portions of the plastics sleeve which cooperate with the surface of the rigid tubular second part to constitute the means referred to for preventing escape of lubricant from the chamber.

The series of intersecting ribs may comprise a circumferentially spaced, axially extending, set of ribs lying parallel to the pivotal axis of the joint and circumferentially extending ribs intersecting the axially extending ribs, or might comprise two intersecting sets of helically extending ribs, or if desired a set of helically extending ribs intersected by a set of axially extending ribs or by a set of circumferentially extending ribs.

In any case where, as in the preferred arrangements mentioned above, the bearing surface of the polyurethane, or the like, plastics sleeve is constituted by a series of spaced ribs dividing the fluid lubricant chamber into a series of compartments, the slight degree of change in the volume of the various compartments, with changes in the direction and/or value of the radial load imposed upon the joint, will tend to cause slight flow of the fluid lubricant between the compartments and thus over the bearing surfaces of the ribs and thereby maintain satisfactory lubrication, while the seals at the ends of the fluid lubricant chamber can ensure the maintenance of such lubrication of the bearing surfaces throughout the normal working life of the joint without periodic injection of further lubricant.

The term "fluid lubricant" is used herein to mean a lubricant, which may conveniently be a silicone grease, so that it can be caused to flow from one chamber or compartment to another with changes in the dimensions of the chamber rather than a lubricant which will necessarily flow under the action of gravity alone.

The invention may be applied with advantage to pivotal joints of the kind in question which are intended for use in pairs in assemblies, such as vehicle suspension assemblies, in which a rigid outer member is provided with a socket in the form of an open ended bore into the opposite ends of which are inserted two similar pivotal joints according to the invention in which the fourth parts comprise the innermost parts and are sleeves through which a pin passes with a close fit, the pin being secured to the inner sleeves as by means of a nut on one end of the pin which engages the outer face of one of the sleeves and draws a flange or the equivalent at the other end of the pin into close engagement with the outer face of the other sleeve.

The invention may be carried into practice in various ways but one specific construction of joint according to the invention will now be described by way of example with reference to the accompanying drawings, in which.

Figure 1:
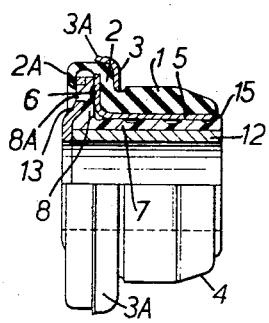
FIGURE 1 is a side elevation of the joint with the upper part above the rotary axis being shown in section.
Figure 2:
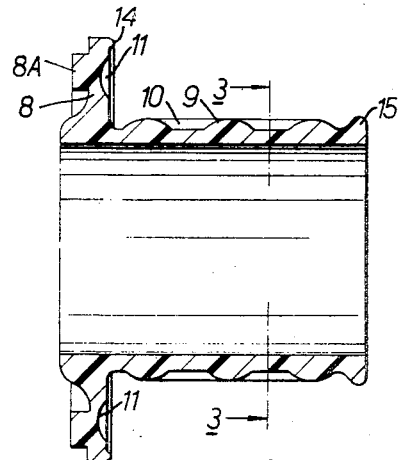
FIGURE 2 is a longitudinal section on an enlarged scale of the polyurethane or like non-metallic sleeve employed in the joint shown in FIGURE 1.
Figure 3:
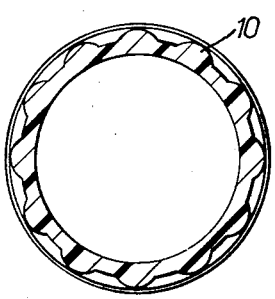
FIGURE 3 is a cross-section in the plane 3—3 indicated in FIGURE 2.
Figure 4:
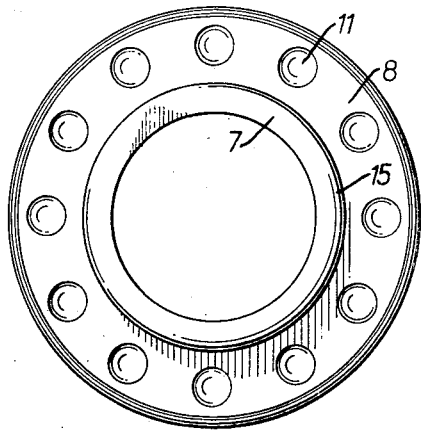
FIGURE 4 is an end elevation of the sleeve shown in FIGURE 3 looking from the right in FIGURE 2.

In the construction shown in the drawings the pivotal joint includes a generally tubular rubber bushing 1 having an integral radial flange 2 at one end against the inner face of which lies a metal plate 3, which may be bonded to the face and/or have an axially extending flange 3A which may somewhat compress the flange 2 radially so as to hold, or assist in holding, the plate 3 in position. The end portion of the outer circumferential surface of the bushing remote from the flange 2 is formed with a frustoconical taper as shown at 4. Lying within and bonded to the bushing 1 is a rigid metallic sleeve 5 having a radial flange 6 at one end which engages and is also bonded to the outer face of the flange 2 of the rubber bushing.

Lying within the rigid tubular sleeve 5 is a sleeve 7 of polyurethane or other non-metallic bearing material of similar character having substantially less flexibility than the rubber constituting the rubber bushing 1. The polyurethane sleeve 7 has a flange 8 at one end the inner face of which lies in contact with the outer face of the radial flange 6 as shown, and the outer circumferential surface of the polyurethane sleeve 7 is formed with a series of circumferential ribs 9 which intersect with axially extending ribs 10, while the inner face of the flange 8 is provided with a series of circular cup-like recesses 11. Disposed within and bonded or otherwise caused to adhere, e.g. by friction to the polyurethane sleeve 7 is an inner rigid metallic sleeve 12 having welded or otherwise united to the end adjacent to the flange 8, a flange 13 which is not only bonded to the outer face of the flange 8 of the polyurethane sleeve but is provided with a series of apertures into which extend projections 8A on the flange 8. It will be understood that the projections 8A are conveniently constituted by parts of the polyurethane which enter the apertures in the flange 13, e.g. during the process of moulding and bonding the polyurethane element 7, 8 to the inner rigid metallic sleeve 12 and its attached flange 13 or when the polyurethane element 7, 8 is circumferentially stretched onto the rigid metallic sleeve 12.

The flange 8 of the polyurethane sleeve is formed to provide on the outer circumferential part of its inner face an annular sealing rib, indicated at 14, which bears against a corresponding annular surface of the outer face of the flange 6, while the end of the polyurethane sleeve 7 remote from the flange 8 is provided with an annular outwardly extending rib 15 which forms a seal with an annular surface on the adjacent end of the rigid tubular member 5. There is thus enclosed between those parts of the adjacent faces of the polyurethane member 7, 8 and the rigid member 5, 6 which extend from the sealing rib 14 to the sealing rib 15, a number of chambers represented by the recesses 11 and the space between the ribs 9 and 10 which is divided into compartments, all these chambers being filled with a fluid lubricant such as silicone grease.

As will be seen, the flange 2 of the rubber bushing 1 is provided with an extension 2A which extends around and overlaps the outer edges of the flanges 8 and 13.

In use two assemblies as shown in FIGURE 1 may be inserted into opposite ends of the bore of a socket constituting a rigid outer member, the diameter of the bore being such as to provide for a degree of radial compression of the rubber bushings. The socket therefore constitutes one of the two parts to be pivotally connected by the pivotal joint, the other of these two parts being constituted by a pin which extends through the bores of the two pivotal joints and is provided at its one end with a flange against which bears the outer face of the flange 13 of one of the pivotal joints and has a screwthread at its other end engaged by a nut which, with the interposition of a washer, bears upon the outer face of the flange 13 of the other pivotal joint.

The inner ends of the inner sleeves 12 of the two pivotal joints conveniently abut against one another within the bore of the rigid outer socket, the dimensions of which will be such that under these conditions the pin is firmly clamped to the inner sleeves 12 but no excessive pressure is exerted between the flanges 8 and the flanges 6.

What I claim as my invention and desire to secure by Letters Patent is:

1. A pivotal joint including an elastomeric sleeve, a rigid metallic tube within and contacting the inner surface of said sleeve and being held substantially against relative rotation therewith, a polyurethane sleeve within and contacting the inner surface of said tube and being capable of relative rotation therewith, said polyurethane sleeve having a lower flexibility than that of said elastomeric sleeve and having at least one chamber on its outer periphery, a fluid lubricant contained within said at least one chamber thereby lubricating the contacting surfaces of said polyurethane sleeve and said tube, said polyurethane sleeve being retained on an inner metallic sleeve against relative rotation therewith, said polyurethane sleeve and said inner metallic sleeve each being provided with radial flanges in abutting relationship and each having cooperating projections and recesses located on said radial flanges to prevent their relative rotation, said elastomeric sleeve being provided with a radial flange having an extension thereto extending around and overlapping the outer edges of said polyurethane sleeve and said metallic sleeve radial flanges, and means provided on said polyurethane sleeve to substantially prevent escape of lubricant from the respective ends of said polyurethane sleeve and said tube.

2. A pivotal joint as claimed in claim 1 wherein said polyurethane sleeve is bonded onto said inner metallic sleeve.

3. A pivotal joint as claimed in claim 1 wherein said polyurethane sleeve is frictionally adhered to said inner metallic sleeve.

4. A pivotal joint as claimed in claim 1 wherein said polyurethane sleeve is retained on said inner metallic sleeve by means of an interference fit such that said polyurethane sleeve is slightly stretched circumferentially when in position on said inner metallic sleeve.

5. A pivotal joint as claimed in claim 1 wherein a series of intersecting ribs extending circumferentially and axially are provided on said outer periphery of said polyurethane sleeve so as to divide said chamber containing said fluid lubricant into a series of compartments.

6. A pivotal joint as claimed in claim 5 in which said series of intersecting ribs comprises a circumferentially spaced axially extending set of ribs lying parallel to the pivotal axis of the joint and circumferentially extending ribs intersecting the axially extending ribs.

7. A pivotal joint as claimed in claim 1 in which said lubricant is a silicone grease.

8. A pivotal joint as claimed in claim 5 wherein said means for preventing escape of lubricant comprises annular end portions on said polyurethane sleeve which cooperate with said tube.

9. A pivotal joint as claimed in claim 1 in which said tube is provided with a radially extending flange bearing against one face of a radially extending flange provided on said polyurethane sleeve, said flange of said tube being bonded to an adjacent face of said flange provided on said elastomeric sleeve.

10. A pivotal joint as claimed in claim 9 in which one end of said elastomeric sleeve remote from said elastomeric sleeve flange is outwardly tapered along its circumferential surface.

11. A pivotal joint as claimed in claim 9 in which the face of said radially extending flange of said polyurethane sleeve which abuts said flange on said tube is provided with at least one recess containing said fluid lubricant.

References Cited

UNITED STATES PATENTS

| | | | |
|---|---|---|---|
| 2,868,571 | 1/1956 | Owen | 287—85 |
| 2,981,573 | 4/1961 | Reuter | 308—36.1 |
| 3,072,448 | 1/1963 | Melton | 280—95 |
| 3,075,786 | 1/1963 | Freers | 287—85 |
| 3,133,769 | 5/1964 | Drake | 308—26 X |
| 3,177,559 | 4/1965 | Boschi | 287—85 X |
| 3,188,152 | 6/1965 | Miller | 308—36.1 |
| 3,298,762 | 1/1967 | Peck | 308—240 |
| 3,331,642 | 7/1967 | Krauss | 308—26 X |
| 3,383,144 | 5/1968 | Zapponi | 308—36.1 |

FOREIGN PATENTS

| | | |
|---|---|---|
| 1,435,111 | 12/1966 | France. |
| 621,355 | 4/1949 | Great Britain. |
| 805,539 | 12/1958 | Great Britain. |
| 1,028,112 | 5/1966 | Great Britain. |
| 139,516 | | U.S.S.R. |

MARTIN P. SCHWADRON, Primary Examiner

L. L. JOHNSON, Assistant Examiner

U.S. Cl. X.R.

287—85; 308—36.1, 238, 240